US010577954B2

(12) United States Patent
Kington et al.

(10) Patent No.: US 10,577,954 B2
(45) Date of Patent: Mar. 3, 2020

(54) BLOCKAGE-RESISTANT VANE IMPINGEMENT TUBES AND TURBINE NOZZLES CONTAINING THE SAME

(71) Applicant: HONEYWELL INTERNATIONAL INC., Morris Plains, NJ (US)

(72) Inventors: Harry Lester Kington, Scottsdale, AZ (US); Daniel C. Crites, Mesa, AZ (US); Jeff Howe, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 367 days.

(21) Appl. No.: 15/470,471

(22) Filed: Mar. 27, 2017

(65) Prior Publication Data

US 2018/0274377 A1  Sep. 27, 2018

(51) Int. Cl.
*F01D 5/14* (2006.01)
*F01D 9/04* (2006.01)
(Continued)

(52) U.S. Cl.
CPC ............ *F01D 9/041* (2013.01); *F01D 5/189* (2013.01); *F01D 9/065* (2013.01);
(Continued)

(58) Field of Classification Search
CPC ......... F05D 2260/201; F05D 2240/127; F05D 2240/128; Y02T 50/676; F01D 5/189; F23R 2900/03044
(Continued)

(56) References Cited

U.S. PATENT DOCUMENTS 4,297,077 A * 10/1981 Durgin .................... F01D 5/189
                                                                    416/97 R
5,100,293 A *  3/1992 Anzai ..................... F01D 5/186
                                                                    416/96 A
(Continued)

FOREIGN PATENT DOCUMENTS

EP  1022434 A2  7/2000
EP  3002412 A1  4/2016
(Continued)

OTHER PUBLICATIONS

Extended EP Search Report for Application No. 18163199.5-1006 dated Jul. 25, 2018.

*Primary Examiner* — Long T Tran
*Assistant Examiner* — James J Kim
(74) *Attorney, Agent, or Firm* — Lorenz & Kopf, LLP

(57) ABSTRACT

Vane impingement tubes having blockage deterrent features are provided, as turbine nozzles containing blockage-resistant vane impingement tubes. In an embodiment, the turbine nozzle includes inner and outer annular endwalls, and turbine nozzle vanes arranged in an annular array between the outer and inner annular endwalls. Vane impingement tubes are inserted into the turbine nozzle vanes. The vane impingement tubes each includes a tube body, an impingement outlet formed in the tube body and configured to discharge airflow for impingement against one of the turbine nozzle vanes, a first flow-turning feature located in the tube body, and an inlet formed in the tube body and configured receive cooling airflow in a substantially radial direction. The first flow-turning feature is shaped and positioned to turn the airflow received through the inlet in a substantially axial direction, which is perpendicular to the radial direction, prior to discharge through the impingement outlet.

19 Claims, 5 Drawing Sheets

(51) Int. Cl.
*F01D 9/06* (2006.01)
*F01D 5/18* (2006.01)

(52) U.S. Cl.
CPC .... *F05D 2240/127* (2013.01); *F05D 2250/71* (2013.01); *F05D 2260/201* (2013.01); *F05D 2260/2212* (2013.01); *F05D 2260/22141* (2013.01); *Y02T 50/676* (2013.01)

(58) Field of Classification Search
USPC .......................................................... 415/115
See application file for complete search history.

(56) References Cited

U.S. PATENT DOCUMENTS

| | | | |
|---|---|---|---|
| 5,609,779 | A | 3/1997 | Crow et al. |
| 6,164,913 | A | 12/2000 | Reddy |
| 7,244,101 | B2 | 7/2007 | Lee et al. |
| 7,377,747 | B2 | 5/2008 | Lee |
| 7,413,406 | B2 | 8/2008 | Pietraszkiewicz et al. |
| 7,563,073 | B1 | 7/2009 | Liang |
| 7,955,053 | B1 | 6/2011 | Liang |
| 8,307,657 | B2 | 11/2012 | Chila |
| 8,584,470 | B2 | 11/2013 | Zelesky et al. |
| 8,657,576 | B2 * | 2/2014 | Tibbott ................. F01D 5/187 416/96 R |
| 8,757,974 | B2 | 6/2014 | Propheter-Hinckley et al. |
| 8,864,444 | B2 | 10/2014 | Antunes et al. |
| 9,279,331 | B2 | 3/2016 | Levine et al. |
| 9,394,798 | B2 * | 7/2016 | Crites ..................... F01D 5/186 |
| 9,447,692 | B1 | 9/2016 | Liang |
| 9,797,261 | B2 * | 10/2017 | Tibbott .................. F01D 5/188 |
| 2009/0246023 | A1 * | 10/2009 | Chon ...................... F01D 5/188 416/95 |
| 2011/0250058 | A1 * | 10/2011 | Suchezky ............... F01D 5/147 415/189 |
| 2014/0093390 | A1 * | 4/2014 | Pointon .................. F01D 5/186 416/97 R |
| 2014/0219788 | A1 * | 8/2014 | Nilsson .................. F01D 5/189 415/175 |
| 2014/0286790 | A1 | 9/2014 | Molter et al. |
| 2016/0031096 | A1 * | 2/2016 | Koenig .................... B26B 1/02 30/161 |
| 2016/0061451 | A1 | 3/2016 | Dudebout et al. |
| 2016/0097286 | A1 * | 4/2016 | Tibbott .................. F01D 5/188 415/1 |
| 2016/0273371 | A1 * | 9/2016 | Groom ................... F01D 5/147 |
| 2017/0002664 | A1 | 1/2017 | McKenzie et al. |

FOREIGN PATENT DOCUMENTS

| | | |
|---|---|---|
| EP | 3070265 A1 | 9/2016 |
| EP | 3133242 A1 | 2/2017 |
| WO | 2015009392 A2 | 1/2015 |
| WO | 2017013354 A1 | 1/2017 |

* cited by examiner

BLOCKAGE-RESISTANT VANE IMPINGEMENT TUBES AND TURBINE NOZZLES CONTAINING THE SAME

TECHNICAL FIELD

The following disclosure relates generally to gas turbine engines and, more particularly, to vane impingement tubes having blockage deterrent features, as well as to turbine nozzles containing blockage-resistant vane impingement tubes.

BACKGROUND

Turbine nozzles are common components of Gas Turbine Engines (GTE). The purpose of a turbine nozzle is to meter and accelerate combustive gas flow, while turning the gas flow towards the blades of a turbine rotor located immediately downstream of the turbine nozzle. To serve this purpose, a turbine nozzle contains a number of airfoil-shaped vanes, which are arranged in an annular array extending between inner and outer annular endwalls. During GTE operation, the turbine nozzle vanes are bathed in combustive gas flow and consequently subject to high thermal loads, pronounced thermal cycling, and rapid gas velocities. This is particularly true in the case of a High Pressure (HP) turbine nozzle, which is positioned immediately downstream of the GTE combustor and thus directly exposed to combustive gas flow at peak temperatures and velocities. For this reason, it may be desirable, if not necessary to provide cooling to the turbine nozzle vanes and, specifically, the leading edge regions of the turbine nozzle vanes. Such cooling is intended to prevent premature failure of the turbine nozzle vanes, while allowing operation of the GTE at relatively high combustor outlet temperatures.

Vane impingent tubes can be utilized to cool the leading edge portions of the turbine nozzle vanes. Generally, vane impingement tubes are inserted into the hollow bodies of the turbine nozzle vanes through openings in the outer annular endwall. When supplied with secondary cooling airflow, the vane impingement tubes direct cooling jets against interior surfaces of the leading turbine nozzle vane regions to convectively remove heat from the nozzle vanes and provide the desired impingement cooling effect. Additional heat may also be convectively transferred to the cooling airflow as the air flows along the interior surfaces of the turbine nozzle vane, as well as conductively transferred to the vane impingement tubes via contact with ribs or other internal structures of the turbine nozzle vanes. Overall, the usage of such vane impingement tubes can provide a highly effective internal impingement cooling scheme, which maintains the turbine nozzle vanes at sufficiently low temperatures to avoid premature structural failure and prolong the serviceable lifespan of the turbine nozzle. The enhanced cooling afforded by the vane impingement tubes may be hindered or entirety thwarted, however, should there develop a blockage or occlusion impeding airflow through one or more of the impingement tubes.

BRIEF SUMMARY

Embodiments of turbine nozzles containing blockage-resistant vane impingement tubes are provided. In an embodiment, the turbine nozzle includes an outer annular endwall, an inner annular endwall radially spaced from the outer annular endwall, and turbine nozzle vanes arranged in an annular array positioned between the outer and inner annular endwalls. Vane impingement tubes are inserted into the turbine nozzle vanes for cooling purposes. The vane impingement tubes each include a tube body, an impingement outlet formed in the tube body and configured to discharge airflow for impingement against one of the turbine nozzle vanes, a first flow-turning feature located in the tube body, and an inlet formed in the tube body and configured to receive cooling airflow in a substantially radial direction. The first flow-turning feature is shaped and positioned to turn the airflow received through the inlet in a substantially axial direction, which is perpendicular to the radial direction, prior to discharge through the impingement outlet. The first flow-turning feature can be, for example, a curved flow guidance structure or a curved flow passage within the tube body. In certain embodiments, the vane impingement tubes may also contain other blockage deterrent features, such as turbulator structures and/or outlets having convergent nozzle geometries.

In a further embodiment, the turbine nozzle includes an outer annular endwall, an inner annular endwall radially spaced from the outer annular endwall, and turbine nozzle vanes arranged in an annular array positioned between the outer and inner annular endwalls. Vane impingement tubes extend into the turbine nozzle vanes. The vane impingement tubes each include a tube body, an inlet formed in the tube body, an impingement outlet formed in the tube body and configured to discharge airflow for impingement against one of the turbine nozzle vanes, and a first turbulator structure located in the tube body. The first turbulator structure is shaped and positioned to impart turbulence to the airflow conducted through the tube body and discharged through the impingement outlet. For example, the first turbulator structure may be implemented as a generally cylindrical bar or rounded cross-beam, which creates shedding vortices proximate the impingement outlet. In certain embodiments, the vane impingement tubes may each further include a flow-turning feature having an inlet end and an outlet end, and the turbulator structure may be located substantially between the impingement outlet and the outlet end of the flow-turning feature, as taken in an axial direction.

Embodiments of vane impingement tubes having blockage deterrent features are further provided. In one embodiment, the vane impingement tube includes a tube body shaped and sized for insertion into a turbine nozzle vane of a turbine nozzle. An impingement outlet is formed in the tube body and is configured to discharge airflow for impingement against a leading edge region of the turbine nozzle vane when the tube body is inserted into the turbine nozzle vane. A first flow-turning feature is located in the tube body, while an inlet is formed in the tube body and configured to receive airflow in a substantially radial direction. The first flow-turning feature is shaped and positioned to turn the airflow received through the inlet in a substantially axial direction, which is perpendicular to the radial direction, prior to discharge through the impingement outlet. In further embodiments, the vane impingement tubes may also contain other blockage deterrent features in addition to or in lieu of the first flow-turning features, such as turbulator structures and/or outlets having convergent nozzle geometries.

BRIEF DESCRIPTION OF THE DRAWINGS

At least one example of the present disclosure will hereinafter be described in conjunction with the following figures, wherein like numerals denote like elements, and.

DETAILED DESCRIPTION

Figure 1:
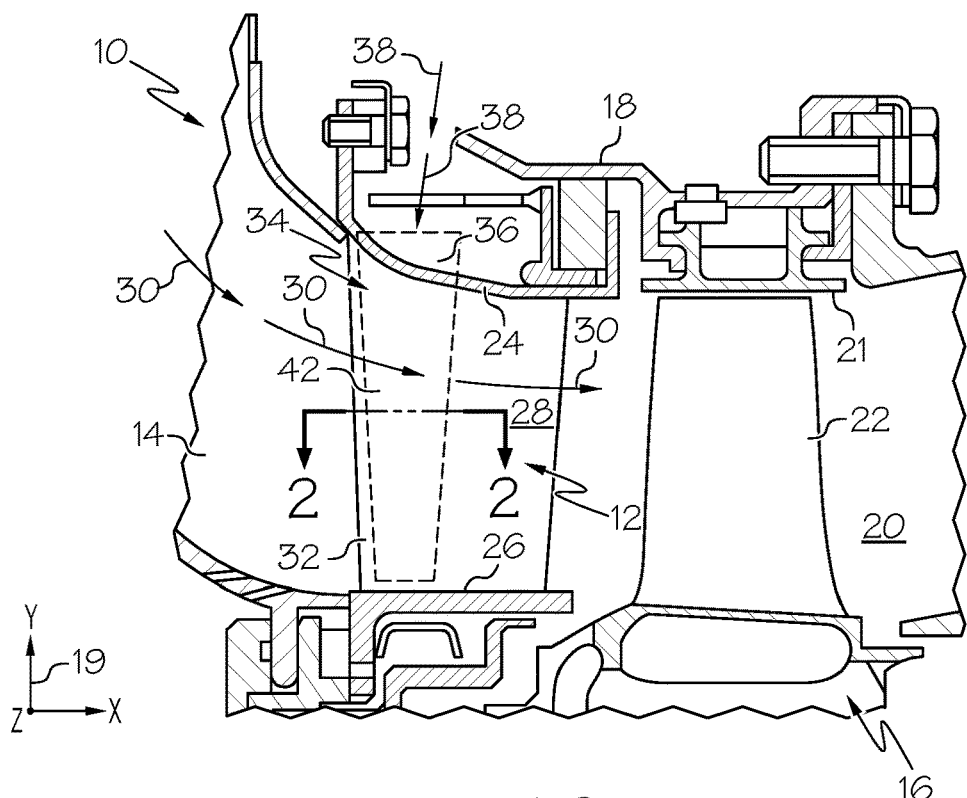
FIG. 1 is a cross-sectional schematic of a portion of a gas turbine engine including a High Pressure (HP) turbine nozzle, a blockage-resistant vane impingement tube (shown in phantom), and a HP turbine rotor, as illustrated in accordance with an exemplary embodiment of the present disclosure.

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

As briefly described above, vane impingement tubes can be utilized to provide cooling to the vanes of a turbine nozzle contained within a Gas Turbine Engine (GTE). Impingement tube-based cooling is only effective, however, to the extent that cooling flow through the vane impingement tubes remains uninterrupted. Unfortunately, flow-impeding occlusions or blockages can gradually develop within the vane impingement tubes. Such occlusions or blockages may occur due to the initial deposition and subsequent aggregation of particulate matter entrained in the cooling airflow conducted through the vane impingement tubes. Flow-impeding blockages are particularly likely to develop when a turbine nozzle is contained within a GTE, which is operated in a debris-laden open air environment. For example, a given GTE may be deployed onboard an aircraft, tank, or other vehicle operated in a desert environment or other environment containing large quantities of airborne particulate matter, such as dust, sand, and siliceous materials prone to the formation of calcium-magnesium aluminosilicates (CMAS) deposits within the GTE. In such debris-laden environments, airborne particles of various sizes may be ingested by the GTE, some fraction of which may ultimately reach the vane impingement tubes. Flow-restricting or flow-preventing blockages may consequently develop within the vane impingement tubes over time, which may diminish the cooling of the nozzle vanes and ultimately result in premature nozzle vane failure due to rapid oxidation or other high temperature failure modes.

The following provides embodiments of turbine nozzles having blockage-resistant vane impingement tubes. Such vane impingement tubes are "blockage-resistant" in the sense that the vane impingement tubes contain unique structural features (hereafter, "blockage deterrent features"), which minimize or deter the deposition and aggregation of particulate matter within the vane impingement tubes. Generally, the blockage deterrent features decrease the likelihood of particle build-up within the vane impingement tubes by reducing regions of flow stagnation within the tube bodies, particularly in regions adjacent the impingement outlet or outlets of the impingement tube. Without being bound by theory, it is believed that such regions of flow stagnation are a primarily contributing factor underlying undesired particle deposition and aggregation within vane impingement tubes operated in environments containing large quantities of airborne particulate matter. When operated in such a debris-laden environment, appreciable quantities of smaller particles (e.g., particles having maximum cross-sectional dimensions less than 5 microns (μm) and, perhaps, maximum diameters less than 1 μm) are often unavoidably directed into the vane impingement tubes during GTE operation. Such small particles may be ingested by the GTE and largely bypass any inertia-based particle removal systems (e.g., an Inlet Particle Separation (IPS) system) due to their low mass. Additionally or alternatively, the GTE may initially ingest larger particles, which are carried into the core flow path and then fractured into smaller particles within the GTE compressor section.

Approaches for preventing particle deposition and aggregation within GTE components have traditionally focused on minimal sizes of flow area restrictions such that the particles would pass through without being held or restricted by the minimal opening. However, it is believed that regions of flow stagnation are of greater concern in exacerbating particle conglomeration in the case of smaller particles sizes (particles having maximum cross-sectional dimensions less than approximately 5 μm) as intermolecular forces, such as van der Waals forces, become increasingly relevant. Thus, in contrast to traditional approaches focusing on particle trapping and impingement avoidance, the blockage deterrent features are adapted to prevent or deter particle build-up by minimizing regions of flow stagnation within the tube bodies, particularly near the impingement outlets at which flow stagnation may otherwise occur. Such blockage deterrent features can include flow-turning features, such as curved flow guidance structures or curved flow passages, which turn airflow in an axial direction (parallel to the centerline of the turbine nozzle) prior to discharge through the impingement outlets. Additionally or alternatively, such blockage deterrent features may include turbulator structures, such as generally cylindrical cross-bars, which introduce shedding vortices or other forms of turbulence to the airflow through the tube bodies. As a further possibility, the blockage deterrent features may include the provision of convergent nozzle geometries to the impingement outlets, which accelerate airflow through the outlets and help reduce regions of stagnation proximate the outlets of the vane impingent tube. Embodiments of the vane impingement tubes can include any combination of the aforementioned features and/or other features adapted to reduce regions of stagnation within the tube bodies.

Approaches for preventing particle deposition and aggregation within GTE components have traditionally focused on minimal sizes of flow area restrictions such that the particles would pass through without being held or restricted by the minimal opening. However, it is believed that regions of flow stagnation are of greater concern in exacerbating particle conglomeration in the case of smaller particles sizes (particles having maximum cross-sectional dimensions less than approximately 5 μm) as intermolecular forces, such as van der Waals forces, become increasingly relevant. Thus, in contrast to traditional approaches focusing on particle trapping and impingement avoidance, the blockage deterrent features are adapted to prevent or deter particle build-up by minimizing regions of flow stagnation within the tube bodies, particularly near the impingement outlets at which flow stagnation may otherwise occur. Such blockage deterrent features can include flow-turning features, such as curved flow guidance structures or curved flow passages, which turn airflow in an axial direction (parallel to the centerline of the turbine nozzle) prior to discharge through the impingement outlets. Additionally or alternatively, such blockage deterrent features may include turbulator structures, such as generally cylindrical cross-bars, which introduce shedding vortices or other forms of turbulence to the airflow through the tube bodies. As a further possibility, the blockage deterrent features may include the provision of convergent nozzle geometries to the impingement outlets, which accelerate airflow through the outlets and help reduce regions of stagnation proximate the outlets of the vane impingent tube. Embodiments of the vane impingement tubes can include any combination of the aforementioned features and/or other features adapted to reduce regions of stagnation within the tube bodies.

Exemplary embodiments of vane impingement tubes having blockage deterrent features will now be described below in conjunction with FIGS. 2-8. Embodiments of methods for the fabrication of such blockage-resistant vane impingement tubes are also described below. First, however, a general description of a turbine nozzle is discussed in conjunction with FIG. 1 to provide an exemplary, non-limiting context in which embodiments of the blockage-resistant vane impingement tubes may be better understood. As the turbine nozzle vanes included within a High Pressure (HP) turbine nozzle are typically subject to the harshest operating conditions (e.g., the highest thermal loads and greatest gas velocities) within the GTE turbine section, the following description focuses primarily on an exemplary HP turbine nozzle containing multiple blockage-resistant vane impingement tubes. The following description notwithstanding, embodiments of the blockage-resistant vane impingement tubes can be utilized in conjunction with any type of turbine nozzle beneficially cooled utilizing an impingement cooling approach and regardless of whether the turbine nozzle is utilized within a GTE or another device, platform, or system, such a turbocharger.

FIG. 1 is a cross-sectional schematic of a portion of a GTE 10 containing an internally-cooled HP turbine nozzle 12, as illustrated in accordance with an exemplary embodiment. In addition to HP turbine nozzle 12, the illustrated portion of GTE 10 further includes a downstream or outlet end of a combustor 14, an HP turbine 16, a surrounding engine case 18, and a turbine shroud 21. While only partially shown, the aforementioned components are each generally axisymmetric about the centerline or rotational axis of GTE 10, which is parallel to the X-axis identified by coordinate legend 19 appearing in the bottom left corner of FIG. 1. A core gas flow path 20 extends through the illustrated portions of GTE 10 and is defined by combustor 14, HP turbine nozzle 12, HP turbine 16, and turbine shroud 21. During operation of GTE 10, combustive gasses are discharged from combustor 14 and progress along flow path 20. HP turbine nozzle 12 is positioned immediately downstream of combustor 14 and upstream of HP turbine 16. HP turbine nozzle 12 thus receives the hot, combustive gas flow discharged by combustor 14. HP turbine nozzle 12 meters, accelerates, and turns the combustive gas flow toward blades 22 of HP turbine 16. After exiting HP turbine nozzle 12, the combustive gas flow drives rotation of HP turbine 16 and the non-illustrated GTE shaft or shafts. This, in turn, drives the rotation of other non-illustrated GTE components (e.g., a fan or compressor rotor) and provides power output, which may be extracted from GTE 10 in different forms.

HP turbine nozzle 12 includes an outer annular endwall 24 and an inner annular endwall 26, which are substantially concentric and radially spaced. Outer and inner annular endwalls 24, 26 bound inner and outer peripheries of the portion of flow path 20, which extends through HP turbine nozzle 12. Turbine nozzle 12 also includes a number of turbine nozzle vanes 28, one of which can be seen in the cross-section of FIG. 1. Turbine nozzle vanes 28 are arranged in an annular array, which is located between annular endwalls 24, 26. Each turbine nozzle vane 28 extends between annular endwalls 24, 26 in a different radial direction similar to the spokes of a wheel; the term "radial direction" defined herein as a direction extending perpendicular to the centerline of turbine nozzle 12 and, perhaps, the centerline or rotational axis of GTE 10. Thus, turbine nozzle vane 28 shown in FIG. 1 extends in a radial direction, which corresponds to the Y-axis of coordinate legend 19. Conversely, the term "axial direction" is defined herein as a direction perpendicular to the radial direction and parallel to the centerline of turbine nozzle 12. The axial direction thus corresponds to the X-axis of coordinate legend 19 shown in FIG. 1. For consistency, this terminology is utilized when describing a turbine nozzle (e.g., turbine nozzle 12 shown in FIG. 1), as well as when describing a vane impingement tube, such as vane impingement tube 34 (described below in conjunction with FIGS. 1-7) or vane impingement tube 90 (described below in conjunction with FIG. 8).

As shown in phantom in FIG. 1, a vane impingement tube 34 is inserted in the hollow body of turbine nozzle vane 28. Similar or identical vane impingement tubes are likewise inserted into the other non-illustrated turbine nozzle vanes 28 of turbine nozzle 12, which may be similar or identical to the illustrated turbine nozzle vane 28. Turbine nozzle 12 thus contains multiple vane impingement tubes 34, which are collectively arranged in an annular array that is substantially concentric with the centerline of nozzle 12. For simplicity, the following description will focus primarily on the illustrated turbine nozzle vane 28 shown in FIGS. 1-2 and the illustrated vane impingement tube 34 shown in FIGS. 1-5; however, the following description is equally applicable to the other non-illustrated vane impingement tubes and nozzle vanes included within turbine nozzle 12. The structural relationship between vane impingement tube 34 and turbine nozzle vane 28 is further illustrated in FIG. 2, which is a cross-sectional view of vane 28 taken along section plane 2-2 identified in FIG. 1. The airfoil-shaped geometry of turbine nozzle vane 28 is also more clearly indicated in FIG. 2, noting that nozzle vane 28 is shown in a flattened or meridional state in the cross-sectional schematic of FIG. 1.

Figure 2:
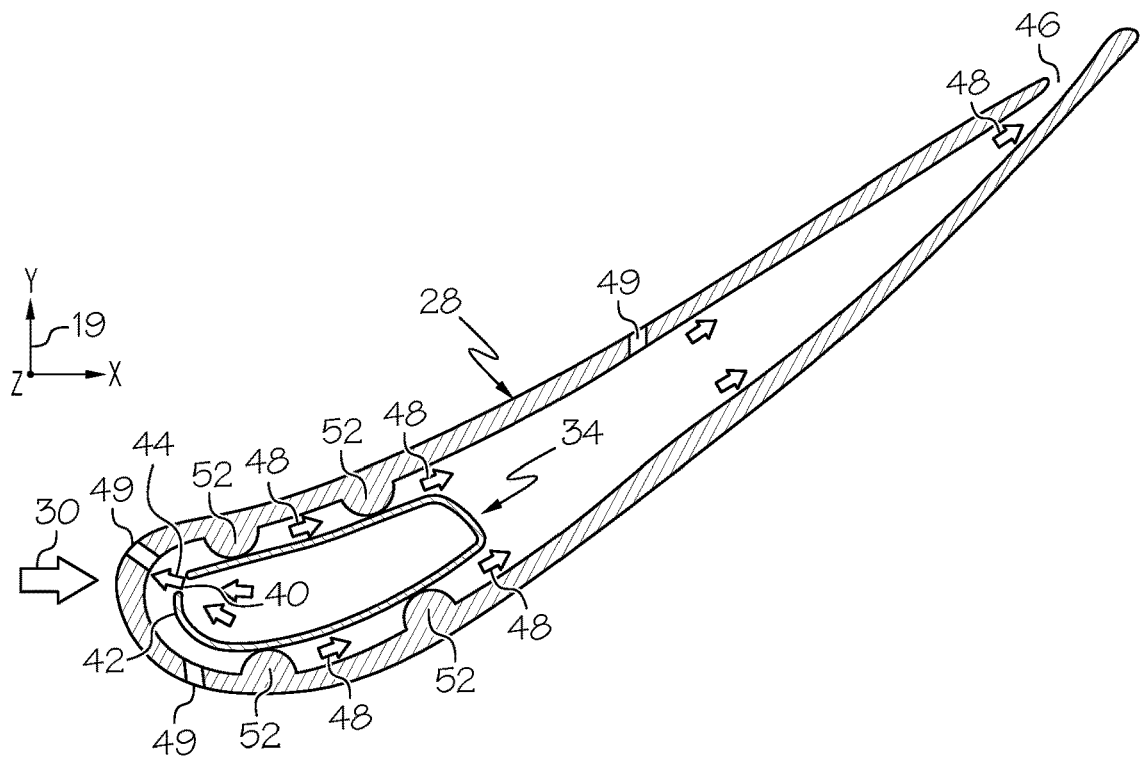
FIG. 2 is a cross-sectional view of the blockage-resistant vane impingement tube and the turbine nozzle vane shown in FIG. 1, as taken along section plane 2-2 identified in FIG. 1.

Referring jointly to FIGS. 1-2, vane impingement tube 34 is utilized to cool turbine nozzle vane 28 during operation of GTE 10. Vane impingement tube 34 supports enhanced convective heat removal targeted at a leading edge portion 32 of turbine nozzle vane 28, which is primarily impinged by the combustive gas flow discharged from combustor 14 (represented by arrows 30 in FIGS. 1-2). During GTE operation, a secondary flow system directs relatively cool airflow into an outboard portion 36 of vane impingement tube 34, as indicated in FIG. 1 by arrows 38. The cooling airflow then flows through the body of vane impingement tube 34 and exits tube 34 via one or more impingement outlets 40 (FIG. 2), which are formed through a forward or leading edge portion 42 of tube 34. When vane impingement tube 34 is properly positioned within turbine nozzle vane 28, impingement outlets 40 are oriented to direct cooling impingement jets against the interior surfaces of leading edge portion 32 of turbine nozzle vane 28. One such cooling jet is represented by arrow 44 in FIG. 2. After impingement against the interior surfaces of leading edge portion 32 of turbine nozzle vane 28, the cooling airflow is then conducted along the interior surface of turbine nozzle vane 28 and ultimately exits vane 28 through a trailing outlet 46, as further indicated in FIG. 2 by arrows 48. In various embodiments, the cooling airflow may additionally exit via film holes 49.

As shown most clearly in FIG. 2, vane impingement tube 34 may be shaped and dimensioned such that a peripheral clearance 50 is provided between tube 34 and the interior surfaces or walls of turbine nozzle vane 28. Peripheral clearance 50 allows the cooling air to flow between vane impingement tube 34 and the interior surfaces of turbine nozzle vane 28 for additional film cooling. A certain amount of conductive heat transfer may occur from turbine nozzle vane 28 to vane impingement tube 34 through a number of protrusions or ribs 52, which project from the interior of vane 28 into peripheral clearance 50 to contact tube 34. Ribs 52 may also help secure vane impingement tube 34 in place by, for example, a press fit interface as tube 34 exerts an expansive spring force against ribs 52. Vane impingement tube 34 may be secured within turbine nozzle vane 28 in another manner, such as by bonding or with fasteners. Ribs 52 may be discontinuous or interrupted, as taken along the length of vane impingement tube 34, to permit the passage of cooling airflow 48 in the manner indicated in FIG. 2. In certain embodiments, vane impingement tube 34 can include a peripheral flange 54 (shown in FIG. 3, described below) or other peripheral projections (e.g., one or more tabs), which extend from outboard portion 36 of tube 34. When vane impingement tube 34 is properly inserted into vane 28, peripheral flange 54 may register to or seat against a mating surface provided adjacent the exterior of outer annular endwall 24 to further secure tube 34 in its desired position.

Figure 3:
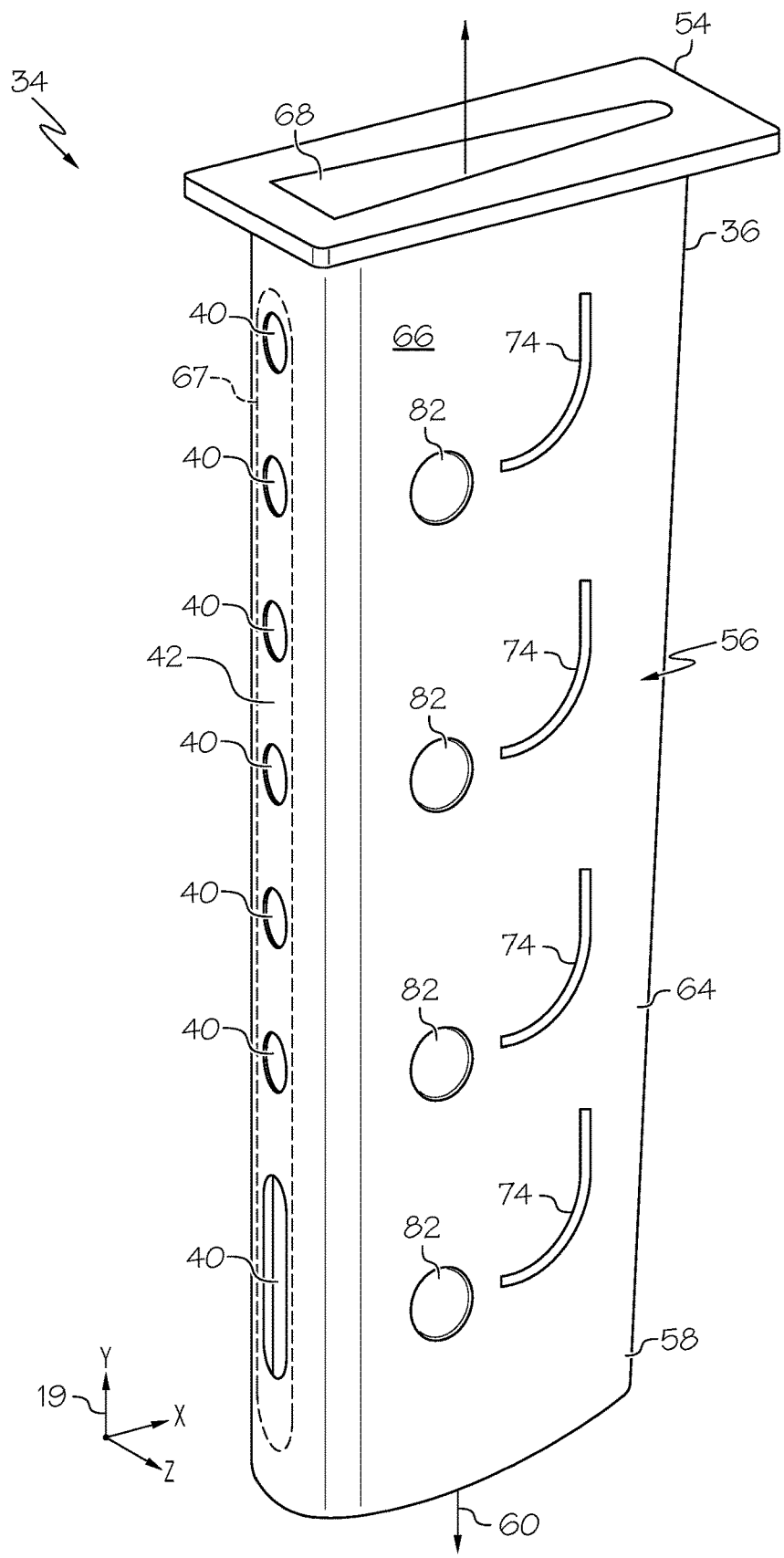
FIGS. 3, 4, and 5 are side isometric, cross-sectional, and top isometric views, respectively, of the blockage-resistant vane impingement tube shown in FIGS. 1 and 2.
Figure 4:
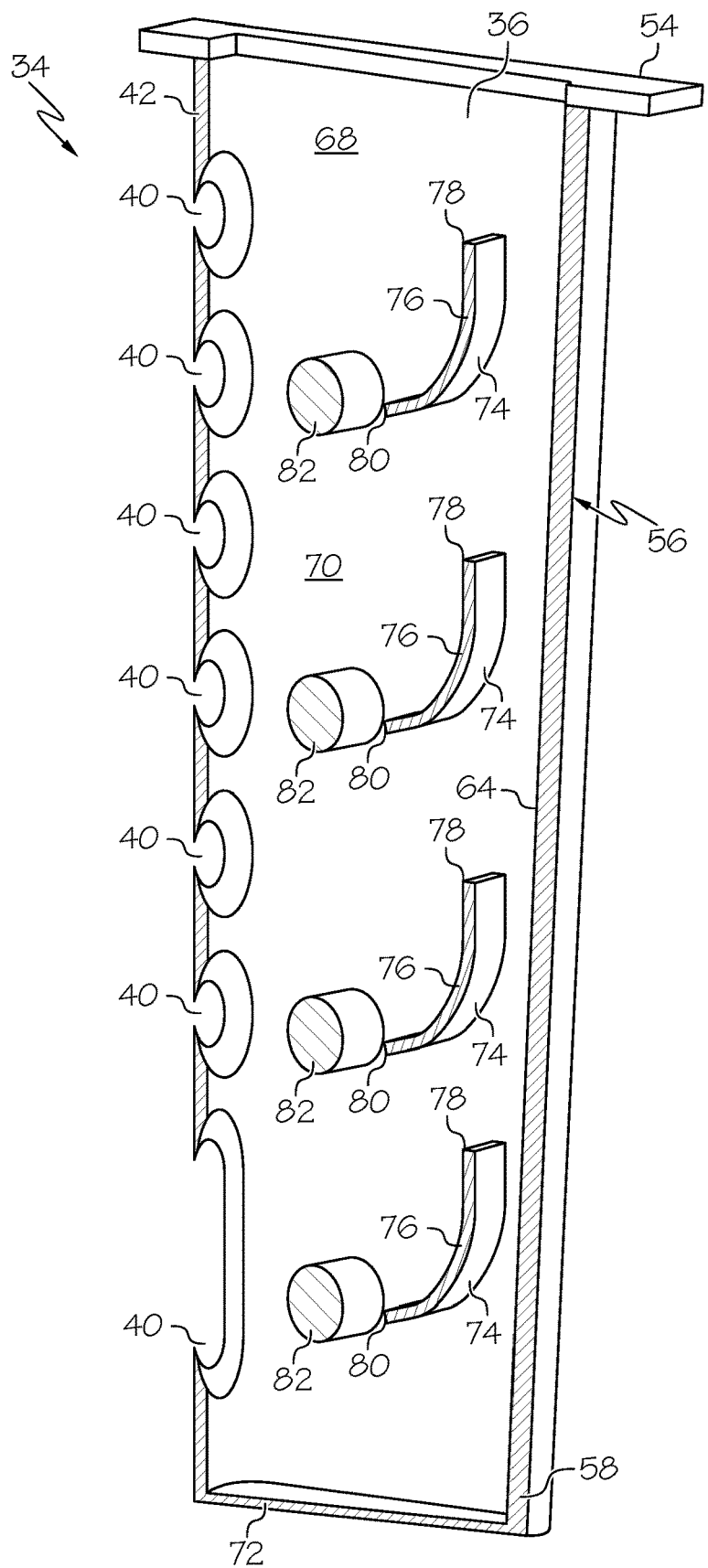
Figure 5:
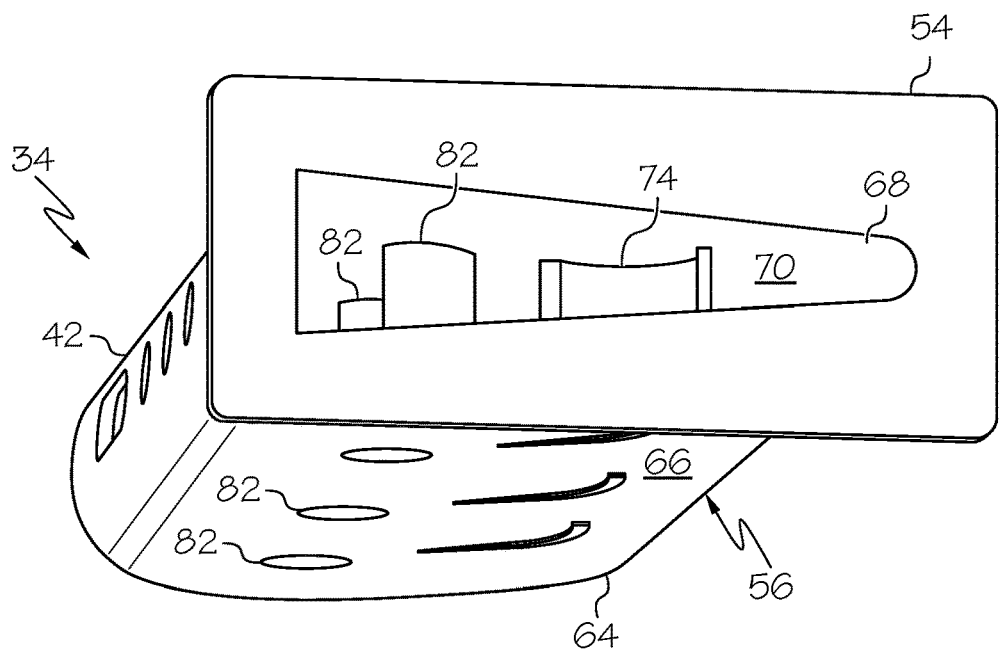

Turning now to FIGS. 3-5, vane impingement tube 34 is shown in greater detail. Utilizing the previously-introduced reference numerals where appropriate, vane impingement tube 34 includes an elongated tube body 56 having a first end portion 36 and an opposing second end portion 58. End portions 36, 58 are referred to hereafter as "outboard end portion 36" and "inboard end portion 58," respectively, in view of their relative proximity to the centerline of turbine nozzle 12 (corresponding to the X-axis of coordinate legend 19) when vane impingement tube 34 is installed within turbine nozzle vane 28. Outboard and inboard end portions 36, 58 are spaced in a radial direction, which corresponds to the Y-axis of coordinate legend 19 (FIG. 3). In addition to end portions 36, 58, vane impingement tube 34 further includes a leading edge portion 42 and an opposing trailing edge portion 64, which are spaced in an axial direction corresponding to the X-axis of coordinate legend 19 (FIGS. 1-3). As previously noted, a peripheral flange 54 may extend around outboard end portion 36 of elongated tube body 56 to help secure vane impingement tube 34 in its desired position. Finally, vane impingement tube 34 further includes opposing sidewalls 66 spaced along an axis orthogonal to the axial and radial directions (corresponding to the Z-axis of coordinate legend 19). Leading edge portion 42, trailing edge portion 64, and opposing sidewalls 66 may be integrally formed, depending upon the manner in which tube body 56 is fabricated.

One or more inlets are provided in outboard end portion 36 of elongated tube body 56; e.g., as shown in FIGS. 3-5, outboard end portion 36 may be produced as an open-ended tube such that a single inlet or mouth 68 is provided therein. Similarly, at least one impingement outlet 40 is provided through one or more regions of tube body 56. In the illustrated example, seven such impingement outlets 40 are formed in leading edge portion 42 and spaced in a radial direction along the length of tube body 56. The spacing, number, dimensions, and planform shapes of impingement outlets 40 will vary amongst embodiments and may be tailored to suit the cooling requirements of a particular turbine nozzle vane. In the illustrated example, impingement outlets 40 are spaced along a tube insertion axis 60 of elongated tube body 56 and arranged in a single row. Outer impingement outlets 40 can be imparted with substantially circular planform geometries, while the innermost outlet 40 is imparted with an ovular planform geometry. In further embodiments, outlets 40 may have other planform geometries and may be provided through other regions of elongated tube body 56, such as through sidewalls 66. In some implementations, a single elongated outlet may be provided through leading edge portion 42 and extend from outboard end portion 36 to inboard end portion 58 of tube body 56; e.g., a single slot or elongated opening 67 may span leading edge region 42 and extend from one end of tube body 56 to the other as indicated by phantom line in FIG. 3. In such embodiments, the single outlet may or may not be provided with a convergent flow area, as described more fully below.

One or more discrete flow passages fluidly connecting inlet 68 to impingement outlets 40 may be provided within elongated tube body 56. Alternatively, elongated tube body 56 may be fabricated to have a hollow construction such that body 56 encloses an internal chamber or elongated cavity 70 (identified in FIG. 4), which is accessible through open outboard end portion 36 of tube body 56. Inboard end portion 58 of elongated tube body 56 may or may not be enclosed; e.g., as shown in FIG. 4, inboard end portion 58 of elongated tube body 56 may be enclosed by an inner endwall 72. Regardless of the particular manner in which inlet 68 is fluidly connected to impingement outlets 40, cooling airflow is received into inlet 68, directed through elongated tube body 56, and ultimately discharged through outlets 40 during operation of GTE 10 (FIG. 1). As described above, this cooling airflow may contain small entrained particles (e.g., particles have maximum cross-sectional dimensions less than 5 μm and possibly less than 1 μm), which tend to aggregate in regions of fluid stagnation within tube body 56 and adjacent impingement outlets 40. For this reason, vane impingement tube 34 is advantageously produced to further include a number of blockage deterrent features, which serve to deter particle deposition and conglomeration within elongated tube body 56. Such blockage deterrent features can include, but are not limited to, internal flow-turning features, turbulator structures, and convergent nozzle geometries. Examples of each of these blockage deterrent features will now be described in detail below.

Vane impingement tube 34 contains one or more flow-turning features, which are shaped and positioned within tube body 56 to turn the airflow received through inlet 68 in an axial direction prior to discharge through impingement outlets 40. This directs airflow into outlets 40 and helps eliminate regions of flow stagnation, which may otherwise occur proximate the edges of impingement outlets 40 absent the flow-turning features and/or the other blockage-deterrent features described herein. In the exemplary embodiment shown in FIGS. 3-5, vane impingement tube 34 includes multiple flow-turning features in the form of curved flow guidance structures 74, which extend between opposing sidewalls 66 of elongated tube body 56 along lateral axes substantially parallel to the Y-axis identified by coordinate legend 19 (FIG. 3). Curved flow guidance structures 74 each include a curved body or wall 76, having an inlet end 78 and an outlet end 80. For each flow guidance structure 74, inlet end 78 is located radially outboard of outlet end 80 and, thus, configured to receive initially air flowing along the length of tube body 56 in a radially inward direction. The airflow is then gradually turned as it progresses along curved wall 76, and then discharged in an axial direction by outlet end 80 toward leading edge portion 42 and impingement outlets 40. In the illustrated example, vane impingement tube 34 includes four such flow guidance structures 74, which are substantially identical and spaced in a radial direction along the length of tube body 56. In further embodiments, vane impingement tube 34 may include other flow-turning features, which may vary in number, type, and/or spatial arrangement; e.g., the flow-turning features may be produced as discrete flow passages in further embodiments, as described more fully below in conjunction with FIG. 8.

Various different fabrication techniques can be utilized to produce vane impingement tube 34 including, for example, casting, additive manufacturing, and metal forming processes. With respect to metal forming, in particular, vane impingement tube 34 can be at least partially fabricated from at least one strip of sheet metal, which is bent into the desired tubular shape to form tube body 56. After formation of tube body 56, additional pieces may be welded to, adhered to, or otherwise joined to tube body 56 to form endwall 72 (FIG. 4) and peripheral flange 54, as appropriate. When producing impingement tube 34 utilizing such a metal forming approach, openings can be formed in selected regions of a metal sheet to define outlets 40 prior to bending or rolling the sheet into tube body 56. Additionally, openings may also be formed in those regions of the metal sheet defining sidewalls 66, either prior to or after forming the metal sheet into the tubular shape of tube body 56. The sidewall openings may be formed to allow insertion of flow guidance structures 74 into tube body 56 after rolling of the metal sheet into its desired tubular shape such that opposing end portions of each flow guidance structure 74 are received in a corresponding pair of sidewall openings, as generally shown in FIGS. 3-5. When so positioned, the opposing ends of flow guidance structures 74 may substantially block or plug the sidewall openings. Welding, brazing, or a similar technique may then be utilized to secure flow guidance structures 74 in place and to form a substantially airtight joint between the end portions of flow guidance structures 74 and opposing sidewalls 66 of tube body 56. Depending upon material types and thicknesses, a non-exhaustive list of material removal processes potentially suitable for forming outlets 40 and/or the sidewall openings includes punching, photoetching, laser cutting, water jetting, and Electro-Discharge Machining (EDM) techniques. In various embodiments, impingement tube 34, with these same features, may also be fabricated utilizing an additive manufacturing techniques, such as direct metal laser sintering.

With continued reference to the exemplary embodiment of FIGS. 3-5, vane impingement tube 34 further contains a number of turbulator structures 82. Turbulator structures 82 are shaped and positioned within tube body 56 to impart turbulence to the airflow conducted through tube body 56 and discharged through impingement outlets 40. In one embodiment, turbulator structures 82 are designed to induce shedding vortices to the flow field proximate outlets 40, which may create unsteady flow states periodically interrupting regions of stagnation. Without being bound by theory, the introduction of turbulence through the strategic incorporation of turbulators into the vane impingement tubes is believed to create dynamic flow fields having a self-cleaning or pressure pulsation effect, which may help to discourage particle deposition or dislodge particle deposits before additional aggregation can occur. To target the flow field adjacent impingement outlets 40 where flow stagnation can occur, turbulator structures 82 may be positioned proximate outlets 40 and, perhaps, between outlets 40 and flow guidance structures 74. Specifically, and as shown most clearly in FIG. 4, each turbulator structure 82 may be positioned adjacent a downstream or outlet end 80 of one of curved flow guidance structures 74. Turbulator structures 82 may assume any form for imparting such turbulence to the airflow conducted through tube body 56. In one implementation, turbulator structures 82 assume the form of generally cylindrical bars, which extend between opposing sidewalls 66 of tube body 56 along axes substantially perpendicular to tube insertion axis 60. In the exemplary embodiment of FIGS. 3-5, impingement tube 34 contains four turbulator structures 82, which are spaced in a radial direction along tube insertion axis 60 (FIG. 3). In further embodiments, turbulator structures 82 may vary in shape, number, and disposition, or vane impingement tube 34 may lack any such turbulator structures.

Turbulator structures 82 may be integrally joined to opposing sidewalls 66 in embodiments wherein vane impingement tube 34 is produced by casting, metal injection molding, additive manufacturing, or utilizing a similar process. In other embodiments, turbulator structures 82 may be discrete pieces or cross-members, which are initially fabricated separately from tube body 56, positioned within impingement tube 34, and then secured to opposing sidewalls 66. For example, in embodiments wherein tube body 56 is produced by forming a metal sheet into the desired tubular shape, sidewall openings can be formed in those portions of the metal sheet corresponding to sidewalls 66. An approach similar to that described above in conjunction with flow guidance structures 74 can then be utilized to install turbulator structures 82 in their appropriate positions. As indicated above, such sidewalls openings can be produced prior to forming the metal sheet into tube body 56 (e.g., via stamping) or after forming the metal sheet into tube body 56 (e.g., via laser cutting or EDM plunging). Afterwards, turbulator structures 82 may then be inserted into tube body 56 from a side thereof such that opposing end portions of structures 82 are received by corresponding pairs of laterally-opposed sidewall openings. Welding, brazing (e.g., utilizing braze foil), or another bonding technique may then be utilized to form airtight joints between the end portions of structures 82 and the surrounding edges of tube body 56. When this approach is employed, the opposing end portions of turbulator structures 82 and curved flow guidance structures 74 may be exposed at sidewalls 66 from the exterior of tube body 56, as generally shown in FIGS. 3 and 5.

Figure 6:
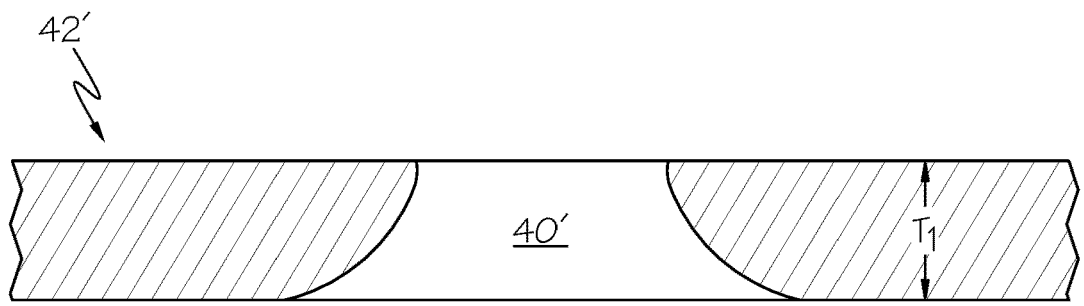
FIGS. 6 and 7 are detailed cross-sectional views illustrating two different convergent nozzle geometries that may be imparted to the outlets of blockage-resistant vane impingement tube shown in FIGS. 1-5.
Figure 7:
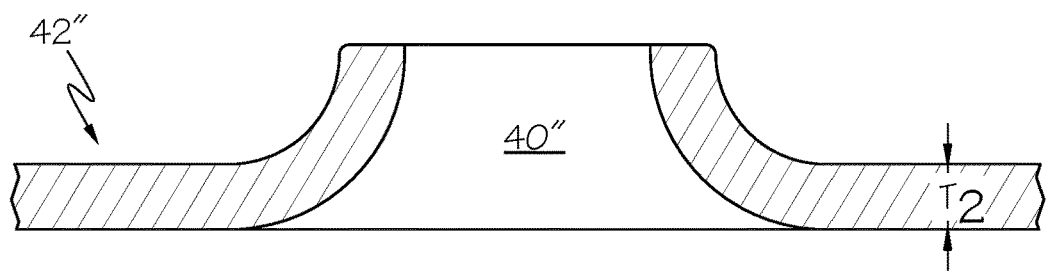

In the exemplary embodiment of FIGS. 3-5, vane impingement tube 34 further includes a third type of blockage deterrent features in the form of impingement outlets 40 having convergent nozzle geometries. As appearing herein, the term "convergent nozzle geometry" refers to an outlet that decreases in cross-sectional flow area when moving at least partially through the outlet in the direction of airflow. By way of illustration, examples of such convergent nozzle geometries are shown in FIGS. 6 and 7. The illustrated impingement outlets 40' and 40" shown in FIGS. 6 and 7, respectively, can be representative of any or all of impingement outlets 40 of vane impingement tube 34 shown in FIGS. 2-5. The prime (') and double prime (") symbols are utilized herein to indicate that impingement outlets 40', 40" generally correspond to impingement outlets 40, but may differ to varying extents. It is also technically possible to impart certain ones of impingement outlets 40 with the convergent nozzle geometry shown in FIG. 6, while imparting other outlets 40 with the convergent nozzle geometry shown in FIG. 7; thus, such features are not mutually exclusive in the context of the present disclosure.

Addressing first the embodiment shown in FIG. 6, leading edge portion 42' is shown as having a moderate wall thickness $T_1$. Here, impingement outlet 40' may be imparted with the illustrated geometry during initial formation of forward edge portion 42' (e.g., as cast-in features), utilizing an additive manufacturing process, or utilizing a controlled material removal process, such as by photoetching the backside of region 84 when tube body 56 is formed from sheet metal. Comparatively, in the case of the embodiment shown in FIG. 7, forward edge portion 42" is shown as having a relatively thin wall thickness $T_2$. In this embodiment, tube body 56 may be produced from a relatively thin metal sheet, which may be relatively difficult to impart with the geometry shown in FIG. 6. Thus, a stamping or die forming process may be employed to bend the regions of the metal sheet around impingement outlet 40" outward and create a convergent nozzle geometry. Again, any such die forming to form the outwardly-protruding convergent nozzle shapes of impingement outlet 40" may be carried-out prior to rolling of the metal sheet into the tubular shape of tube body 56. In other embodiments of vane impingement tube 34, impingement outlets 40 can be imparted with a convergent nozzle geometry in another manner or may not be imparted with a convergent nozzle geometry. Such convergent nozzle geometries reduce regions of stagnation around outlets 40 and tend to accelerate airflow therethrough to decrease the propensity of small airflow-entrained particles to deposit and aggregate within tube body 56.

Figure 8:
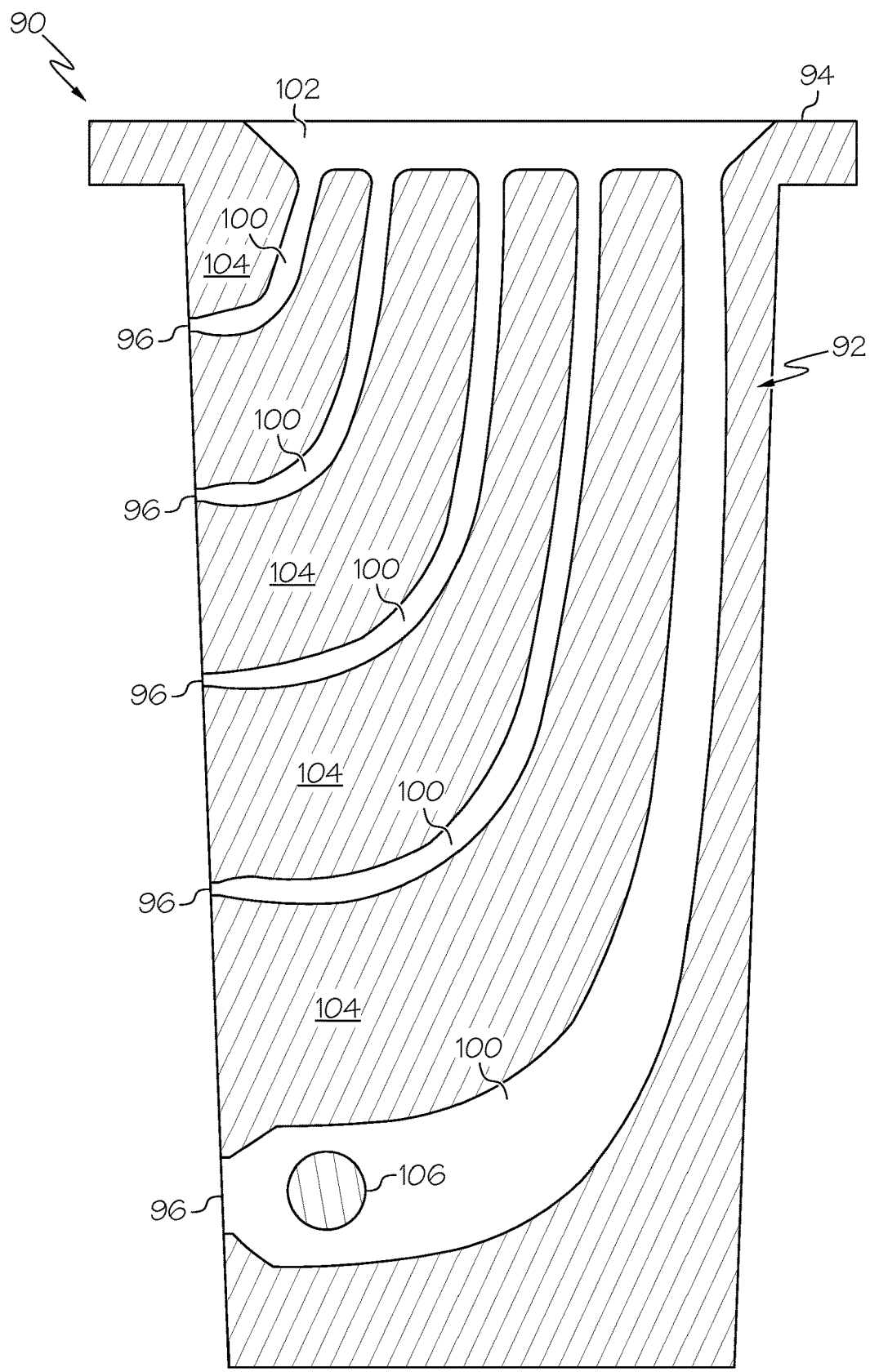
FIG. 8 is a side view of a blockage-resistant vane impingement tube containing flow-turning features in the form of curved flow passages, which is as illustrated in accordance with a further exemplary embodiment of the present disclosure.

There has thus been described an embodiment of a vane impingement tube having blockage deterrent feature, which minimize areas of flow stagnation near the tube outlets to reduce particulate aggregation. The blockage deterrent features may assume various different forms including, but not limited to: (i) flow-turning features, which turn air flow conducted along the tube body (in primarily a radial direction) generally in an axial direction prior to discharge through the impingement outlets; (ii) turbulator structures, which introduce shedding vortices or other forms of turbulence to the flow field proximate the tube outlets; and (iii) vane impingement tube outlets having convergent nozzle geometries. In the above-described embodiment, the flow-turning features assume the form of curved flow guidance structures, which extend laterally within a hollow tube body. In alternative embodiments, the flow-turning features may assume other forms, such as that of curved flow passages. Further illustrating this point, FIG. 8 is a cross-sectional view of a vane impingement tube 90 having an elongated tube body 92, a peripheral flange 94, and a plurality of impingement outlets 96 formed through a leading portion of tube body 92. In this embodiment, vane impingement tube 90 may be additively built, cast, or otherwise produced to include a number of flow passages 100, which fluidly connect an inlet 102 to impingement outlets 96. As can be seen, flow passages 100 are curved in a manner turning airflow received through inlet 102 (received in primarily a radial direction) in axial directions prior to discharge through impingement outlets 96. As previously noted, turning the airflow through vane impingement tube 90 from a radial direction to more of an axial direction as the airflow progresses through tube 90 may help reduce areas of stagnation within tube body 92, particularly near impingement outlets 96. The regions within tube body 92 located between the internal walls defining flow passages 100 (identified in FIG. 8 by reference numeral "104") may be occupied by the parent material of tube 90 (as shown) or may be unfilled voids, which may or may not be backfilled with a suitable high temperature material.

In the embodiment shown in FIG. 8, vane impingement tube 90 is usefully produced to further include turbulator structures and/or convergent nozzle geometries. For example, as shown for lower flow passage 100 in FIG. 8, a turbulator structure 106 (e.g., a generally cylindrical partition or cross-member) may be cast, additively-built, or otherwise produced and oriented to project through lower flow passage 100 in a lateral direction (orthogonal to the axial and radial directions) proximate its associated impingement outlets 96. Again, turbulator structure 106 may be dimensioned and shaped to create shedding vortices periodically disrupting regions of flow stagnation proximate outlets 96. In particular, such shedding vortices may create pulses dislodging aggregated particles and/or otherwise deter the deposition and aggregation of particle deposits in the vicinity of outlets 96. Turbulator structure 106 may extend between and be integrally formed with the opposing sidewalls of tube body 92 in an embodiment. Additionally or alternatively, particle deposition and aggregation proximate outlets 96 may be discouraged by imparting impingement outlets 96 with convergent nozzle geometries. Thus, as indicated in FIG. 8, curved flow passages 100 may be dimensioned such that the cross-sectional dimensions of flow passages 100 decrease when moving in the radial direction from the interior of tube body 56 to the exterior thereof at or near the junctures between flow passages 100 and outlets 96. Furthermore, flow guidance structures 74, convergent flow path geometries, and/or turbulator structures 106 may be provided at inlet 102 of vane impingent tube 90 in certain implementations. In alternative embodiments, flow passage 100 need not be continually converging in all embodiments, nor have the smallest cross sectional area at impingement outlets 96.

There has thus been described multiple exemplary embodiments vane impingement tubes having blockage deterrent features and suitable for usage within internally-cooled turbine nozzles. Embodiments of the above-described blockage-resistant vane impingement tubes contain blockage deterrent features, which are adapted to prevent or at least deter particle deposition and aggregation by, for example, reducing the areas of flow stagnation within the tube bodies. Such blockage deterrent features can include flow-turning features, such as curved walls or curved flow passages, which turn airflow in a substantially axial direction (parallel to the centerline of the turbine nozzle) prior to discharge through the impingement outlets. Additionally or alternatively, such blockage deterrent features may include turbulator structures, such as generally cylindrical crossbars, which introduce shedding vortices or other forms of turbulence to the airflow through the tube bodies. As a still further possibility, the blockage deterrent features may include the provision of convergent nozzle geometries to the impingement outlets, which accelerate airflow through the outlets and help reduce regions of stagnation proximate the outlets. Embodiments of the impingement tubes can include any combination of the aforementioned features and/or other features adapted to reduce regions of stagnation within the tube bodies. The end result is a blockage-resistant impingement tube, which reduces the likelihood of flow-blocking occlusions developing within the impingement tube body and/or outlet(s) to provide reliable, prolonged impingement-based cooling maximizing the service lifespan of a turbine nozzle vane.

In an embodiment, the turbine nozzle includes an outer annular endwall, an inner annular endwall radially spaced from the outer annular endwall, and turbine nozzle vanes arranged in an annular array positioned between the outer and inner annular endwalls. Vane impingement tubes are inserted into the turbine nozzle vanes for cooling purposes. The vane impingement tubes may each include an elongated tube body, an impingement outlet formed in the tube body and configured to discharge airflow for impingement against one of the turbine nozzle vanes, a first flow-turning feature located in the tube body, and an inlet formed in the tube body and configured to receive cooling airflow in a substantially radial direction. The first flow-turning feature is shaped and positioned to turn the air flowing through the tube body from a substantially radial direction toward a substantially axial direction prior to discharge through the impingement outlet. The first flow-turning feature can be, for example, a curved flow guidance structure or a curved flow passage within the tube body.

In various embodiments, the vane impingement tubes may also contain turbulator structures. For example, in certain embodiments, each vane impingement tube may include at least one, if not multiple turbulator structures spaced in a radial direction (e.g., along the above-described tube insertion axis. A given turbulator structure may include or assume the form of a generally cylindrical bar extending substantially orthogonal to the radial and axial directions. In such embodiments, the generally cylindrical bar may have opposing end portions, which are matingly received in (and perhaps substantially block or plug) openings formed in the opposing sidewalls of the impingement tube body. Similarly, in other embodiments, the first flow-turning feature may include or assume the form of a cross-member having a curved flow guidance surface and extending substantially orthogonal to the radial and axial directions. In this case, the cross-member may include opposing end portions, which are received in (and perhaps substantially block or plug) mating openings formed in the opposing sidewalls. In still further implementations, the impingement outlet may be imparted with a convergent nozzle geometry, which decreases in cross-sectional flow area when moving in the radial direction from an interior of the tube body to an exterior thereof.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A turbine nozzle, comprising:
   an outer annular endwall;
   an inner annular endwall radially spaced from the outer annular endwall;
   turbine nozzle vanes arranged in an annular array positioned between the outer and inner annular endwalls; and
   vane impingement tubes inserted into the turbine nozzle vanes, the vane impingement tubes each comprising:
   a tube body including an outboard end portion, an inboard end portion spaced from the outboard end portion in the radial direction, and a leading edge portion extending between the outboard and inboard end portions, the outboard end portion coupled to the outer annular endwall;
   a plurality of impingement outlets formed in the leading edge portion of the tube body and configured to discharge airflow for impingement against one of the turbine nozzle vanes, the plurality of impingement outlets spaced apart from the outboard end portion to the inboard end portion, with an innermost one of the plurality of impingement outlets having a geometry that is different than another one of the plurality of impingement outlets;
   a first flow-turning feature located in the tube body; and
   an inlet formed in the outboard end portion of the tube body and configured to receive airflow in a substantially radial direction, the first flow-turning feature shaped and positioned to turn the airflow received through the inlet in a substantially axial direction, which is perpendicular to the radial direction, prior to discharge through the plurality of impingement outlets.

2. The turbine nozzle of claim 1 wherein the vane impingement tubes each further comprise a turbulator structure located within the tube body, the turbulator structure introducing turbulence to the airflow prior to discharge through the impingement outlet.

3. The turbine nozzle of claim 2 wherein, for each of the vane impingement tubes, the turbulator structure is located adjacent an outlet end of the first flow-turning feature, the first flow-turning feature includes an inlet end radially outboard of the outlet end that is configured to receive the airflow from the inlet and the turbulator structure is positioned between the outlet end and a respective one of the plurality of impingement outlets.

4. The turbine nozzle of claim 2 wherein, for each of the vane impingement tubes, the turbulator structure comprises a generally cylindrical bar extending substantially orthogonal to the radial and axial directions.

5. The turbine nozzle of claim 4 wherein, for each of the vane impingement tubes, the tube body comprises opposing sidewalls; and
   wherein, for each of the vane impingement tubes, the generally cylindrical bar has opposing end portions, which are received in openings formed in the opposing sidewalls.

6. The turbine nozzle of claim 2 wherein, for each of the vane impingement tubes, the turbulator structure is shaped and positioned to create shedding vortices proximate one of the plurality of impingement outlets.

7. The turbine nozzle of claim 1 wherein, for each of the vane impingement tubes, the first flow-turning feature comprises a cross-member having a curved flow guidance surface and extending substantially orthogonal to the radial and axial directions.

8. The turbine nozzle of claim 7 wherein, for each of the vane impingement tubes:
   the tube body comprises opposing sidewalls; and the cross-member has opposing end portions, which are received in mating openings formed in the opposing sidewalls.

9. The turbine nozzle of claim 1 wherein, for each of the vane impingement tubes, the first flow-turning feature comprises a curved flow passage extending from the inlet to a respective one of the plurality of impingement outlets, the curved flow passage having at least one flow-turning section that curves about an axis substantially orthogonal to the radial and axial directions.

10. The turbine nozzle of claim 9 wherein the curved flow passage gradually decreases in a cross-sectional dimension at a juncture with the respective one of the plurality of impingement outlets when moving in the radial direction from an interior of the tube body to an exterior thereof.

11. The turbine nozzle of claim 1 wherein the vane impingement tubes each further comprise a plurality of flow-turning features in which the first flow-turning feature is included, the plurality of flow-turning features spaced along a length of the tube body in the radial direction.

12. The turbine nozzle of claim 1 wherein, for each of the vane impingement tubes, at least one of the plurality of impingement outlets is imparted with a convergent nozzle geometry, which decreases in cross-sectional flow area when moving in the radial direction from an interior of the tube body to an exterior thereof.

13. The turbine nozzle of claim 12 wherein, for each of the vane impingement tubes, at least a portion of the tube body is formed from sheet metal; and
wherein, for each of the vane impingement tubes, a selected region of the sheet metal is die formed to impart the convergent nozzle geometry to the impingement outlet.

14. A turbine nozzle, comprising:
an outer annular endwall;
an inner annular endwall radially spaced from the outer annular endwall;
turbine nozzle vanes arranged in an annular array positioned between the outer and inner annular endwalls; and
vane impingement tubes inserted into the turbine nozzle vanes, the vane impingement tubes each comprising:
a tube body including an outboard end portion, an inboard end portion spaced from the outboard end portion in the radial direction, and a leading edge portion extending between the outboard and inboard end portions, the outboard end portion coupled to the outer annular endwall and the inboard end portion enclosed by an inner endwall;
an inlet formed in the outboard end portion of the tube body configured to receive an airflow;
a flow-turning feature having an inlet end radially outboard of an outlet end, the inlet end configured to receive the airflow from the inlet;
an impingement outlet formed in the leading edge portion of the tube body and configured to discharge the airflow for impingement against one of the turbine nozzle vanes; and
a first turbulator structure located in the tube body between the impingement outlet and the outlet end of the flow-turning feature, the first turbulator structure shaped and positioned to impart turbulence to the airflow conducted through the tube body and discharged through the impingement outlet.

15. The turbine nozzle of claim 14 wherein, for each of the vane impingement tubes, the impingement outlet discharges airflow in primarily an axial direction; and
wherein the vane impingement tubes each comprise a plurality of turbulator structures in which the first turbulator structure is included; and
wherein, for each of the vane impingement tubes, the plurality of turbulator structures are spaced in a radial direction perpendicular to the axial direction.

16. The turbine nozzle of claim 14 wherein, for each of the vane impingement tubes, the first turbulator structure comprises a generally cylindrical bar shaped and positioned to create shedding vortices proximate the impingement outlet.

17. The turbine nozzle of claim 14 wherein at least a portion of the tube body is formed from a strip of sheet metal, which is bent into a tubular shape and in which openings are formed through which the turbulator structures are inserted.

18. The turbine nozzle of claim 14 further comprising a plurality of the impingement outlets spaced apart from the outboard end portion to the inboard end portion, with an innermost one of the plurality of impingement outlets having a geometry that is different than another one of the plurality of impingement outlets.

19. A vane impingement tube, comprising:
a tube body shaped and sized for insertion into a turbine nozzle vane of a turbine nozzle, the tube body including an outboard end portion, an inboard end portion spaced from the outboard end portion in the radial direction, and a leading edge portion extending between the outboard and inboard end portions;
a plurality of impingement outlets formed in the tube body and configured to discharge airflow for impingement against a leading edge region of the turbine nozzle vane when the tube body is inserted into the turbine nozzle vane, the plurality of impingement outlets spaced apart from the outboard end portion to the inboard end portion, with an innermost one of the plurality of impingement outlets having a geometry that is different than another one of the plurality of impingement outlets;
a first flow-turning feature located in the tube body having an inlet end radially outboard of an outlet end; and
an inlet formed in the outboard end portion of the tube body and configured to receive airflow substantially in a radial direction, the first flow-turning feature shaped and positioned to turn the airflow received through the inlet substantially in an axial direction perpendicular to the radial direction prior to discharge through a respective one of the plurality of impingement outlets.

* * * * *